March 19, 1957 L. L. JOHNSON 2,786,170
ELECTRICAL CONTROL SYSTEM
Filed June 29, 1953
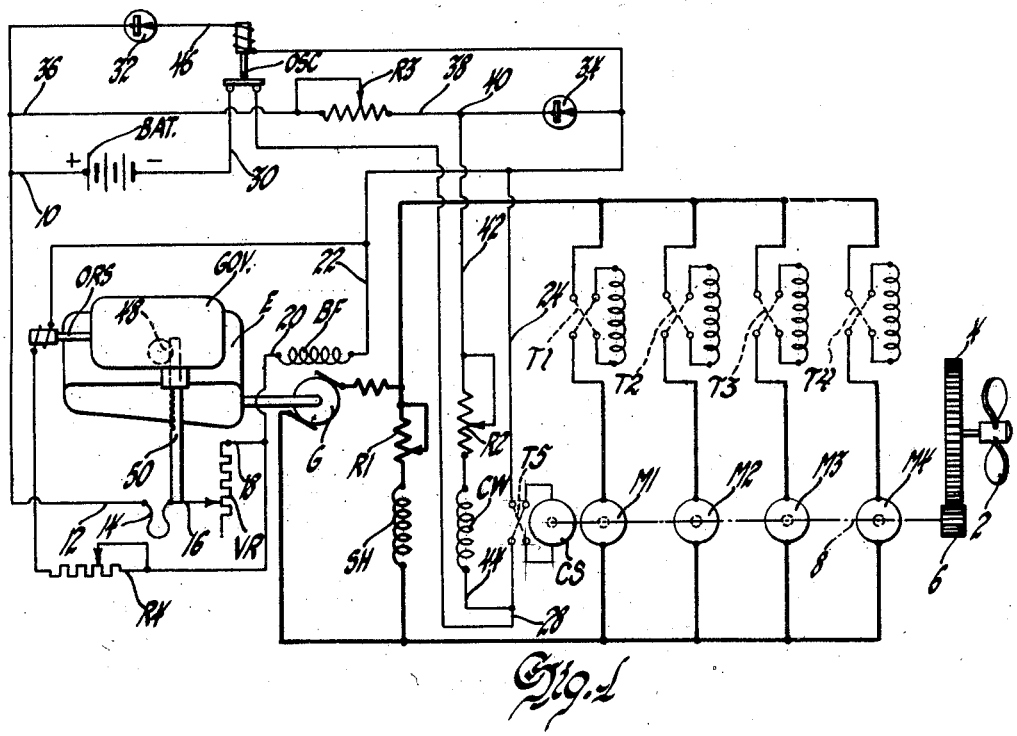
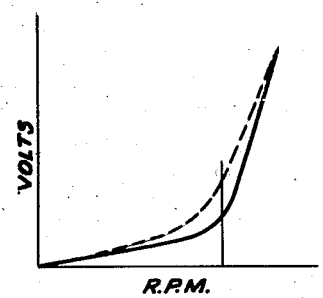
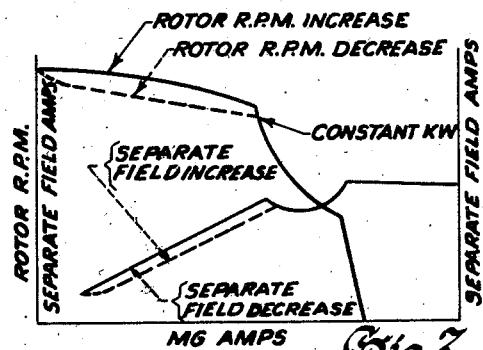
Inventor
Lauren L. Johnson
By J. C. Thorpe
Attorney 2,786,170

ELECTRICAL CONTROL SYSTEM

Lauren L. Johnson, Westchester, Ill., assignor to General Motors Corporation, Detroit, Mich., a corporation of Delaware Application June 29, 1953, Serial No. 364,651

1 Claim. (Cl. 318—146)

This invention relates generally to electrical systems utilizing dynamo electric generators and motors for the conversion and transmission of power, and more particularly to means for regulating generator-motor sets in response to variations in the loads on the motors of these sets.

The invention is even more particularly related to the problems encountered in railway electric motor driven snow plows and therefore will be described in conjunction therewith.

Motor speed control means have previously been provided which will respond to extreme variations in the load applied to power driven generator-motor sets to thereby control these sets so as to maintain a more or less uniform speed of rotation and prevent injury thereto, all without any substantial loss of energy. In order for the railroads to use the means mentioned, however, they would have to purchase or acquire motors and generators specially suited to these means since the usual motor speed control means referred to are not adaptable for use with the types of series traction motors and separately excited shunt main generators normally found in the electrical transmissions of diesel electric locomotives.

In other words, what is needed is a speed and load control which can be used in combination with the type of equipment normally used for powering an electrically driven locomotive when that equipment is being used to drive means subject to widely varying loads, as for example the aforementioned snow plow. Such a control would allow a plow to be built of relatively low cost because the diesel engine which drives the generator and the generator-motor sets could be quickly acquired from stock and in case of damage could be easily replaced. Also, during the snowless periods of the year when the plow would be idle, the diesel engine and the generator-motor sets could be used in regular locomotive service.

It is, therefore, broadly an object of this invention to provide a new means for regulating the voltage of the generator of a generator-motor set whereby more or less voltage is generated as the load of the motor of the set is increased or decreased and its speed correspondingly varied.

It is another object of this invention to provide a motor speed control for a generator-motor set including a separately excited shunt generator and a series motor subject to variable loadings causing a corresponding change in motor speed, the control acting in response to motor speed to control generator voltage, thereby regulating the motor speed within permissible limits without any substantial reduction in the efficiency of the power transmitting system.

It is a further object of this invention to provide a motor speed control for a motor-generator set of the type used in the power transmissions for diesel-electric locomotives.

In the drawings:

Figure 1 is a schematic diagram showing the power circuits for the snow plow in heavy lines with the new low voltage speed control superimposed thereon;

Figure 2 is a volts-R. P. M. graph indicating the voltage-speed characteristic of the control generator;

Figure 3 is a graph indicating the operating characteristics of the new motor speed control.

Referring now to Figure 1, a plow rotor 2 is schematically shown coupled to a driven gear 4 meshing with a driving pinion 6. The driving pinion 6 is coupled to a shaft 8 having the armatures of four series motors M1, M2, M3 and M4 keyed or otherwise suitably attached thereto for causing rotation thereof; these motors being of the type that are normally used to propel an electrically driven locomotive. Each of the motors M1, M2, M3 and M4 is provided with a corresponding series field F1, F2, F3 and F4. The fields F1 through F4 are provided with suitable terminals T1—T1, T2—T2, T3—T3 and T4—T4 which may be oppositely connected to reverse the direction of rotation of the motors M1 through M4 and consequently the direction of rotation of the rotor 2. Connected in electrical circuit with the motors M1 through M4 is a main generator G having a shunt field SH and separately excited field BF, the generator G being of the type normally used in the electrical transmission of a diesel-electric locomotive. The shunt field SH has in electrical circuit therewith an adjustable shunt field circuit resistance R1, which is adjusted to a value above critical so that its voltage will not build up without the separate exciting field BF. It will be observed for the heavy circuit lines of Figure 1 that the motors of M1 through M4 are connected in parallel electrical relationship with the main generator G. The generator G is driven by a diesel engine E of the type normally used as a prime mover on a diesel-electric locomotive. The diesel E is provided with a usual type of speed governor GOV. The governor GOV controls a variable resistor VR which is connected in series electrical circuit with the battery field BF and a battery BAT to automatically regulate the separate excitation of the generator in conformance with a particular engine speed setting.

Secured to one end of the shaft 8 for rotation therewith is the armature of a control generator CS. The armature of control generator CS is also provided with reversible terminals T5—T5 so that it may be properly connected when the directions of rotation of the motors M1, M2, M3 and M4 are reversed. The control generator CS is connected as essentially a self-excited shunt machine having an exciting winding CW whose energization may be adjusted by means of a calibrating resistor R2. The armature of control generator CS is connected in series electrical circuit with the separately excited field BF, the variable resistor VR and the battery BAT so that it bucks the supply of voltage to the separate field BF. This series circuit includes, beginning with the battery BAT, a conductor 10, a conductor 12, a flexible conductor 14, a rheostat wiper arm 16, the variable resistor VR, a conductor 18, a conductor 20, the separately excited field BF, a conductor 22, a conductor 24, the contact terminals T5, a conductor 26, the armature of the control generator CS, the opposite contact terminal T5, a conductor 28, the normally closed interlock of an overspeed relay OSC and a conductor 30 returning to the negative side of the battery BAT.

In order to insure that the proper amount of voltage is applied to the armature of the control generator CS, a rectifier 34 and an adjustable rheostat R3 are provided. The variable rheostat R3 and the rectifier 34, although allowing current to flow through the exciting field CW for the control generator CS, tend to limit the flow of current from the battery BAT through the armature of the control generator CS to a portion of current which must pass through the battery field BF. This may be observed by leaving the positive side of the battery BAT, following the conductor 10, the conductor 12, a conductor 36, the variable resistor R3, and a conductor 38 to a junction point 40. No current can flow to the right of the junction point 40 in the conductor 38 because of the presence of the rectifier 34. Current, however, can flow downwardly from the junction point 40 through a conductor 42, the calibrating resistor R2, the exciting winding CW for the control generator CS, a conductor 44, the conductor 28, the normally closed interlock of the overspeed relay OSC and the conductor 30 returning to the negative side of the battery BAT. The magnitude of the current flow through the conductor 42 and the exciting winding for the control generator CS, however, will be quite small because of the variable resistor R3 and the calibrating resistance R2.

The relay OSC is provided for the purpose of preventing severe overspeeds of the control generator CS from reversing the polarity of the main generator and runaway of the snow plow motors M1 through M4. The overspeed relay OSC, because of a rectifier 32, may be energized only by current flowing from the armature of the control generator CS.

Current limit of the main generator is accomplished by connecting the energizing winding of an overriding solenoid ORS in parallel with the battery field BF. When sufficient current flows through the battery field the solenoid ORS will be energized to override the engine governor and cause a pinion 48 to move the rack 50 to the limit of its travel, thereby placing the maximum resistance of the variable resistor VR in series with the battery field BF. The current at which the overriding solenoid ORS will be energized can be established by means of an adjustable resistor R4.

Referring now to all of the figures, the operation of this speed control will be described:

As the plow rotor 2 is driven by the motors M1 through M4 and as it is subjected to variable loads, the motors being of the series type speed up and slow down. If the load should be substantially reduced, the motors will speed up considerably thereby causing the control generator to speed up considerably. It will be noted by means of Figure 2 that the characteristic of the control generator CS is such that below its critical speed the voltage output of its armature is very small. However, if the speed should increase above its critical value, then incremental increases of speed above that value produce large increments of voltage at the control generator terminals. These large increments of voltage above critical speed cause the separate excitation of the main generator to be reduced and speed regulation is accomplished thereby. If the speed of the control generator CS should become excessive, there is, of course, a danger that the polarity of the separately excited field BF would be reversed, thereby reversing the polarity of the main generator to cause runaway of the snow plow motors. In order to obviate this difficulty, an overspeed relay OSC is provided which may be energized by the current flowing from the control generator armature through the conductor 24, the conductor 22, the energizing winding of a relay OSC, a conductor 46, a rectifier 32, the conductor 12, conductor 10, the battery BAT, the conductor 30, the presently closed contacts of the OSC relay and the conductor 28 returning to the negative side of the control generator CS. Sufficient energization of the winding of the OSC relay opens its normally closed contacts and prevents any further excitation of the generator G until the relay is reset.

One of the advantages of this particular type of speed control is that the hysteresis of the control generator tends to stabilize the variable loading of the plow motors M1 through M4. In other words, as the control generator speed drops off, due to hysteresis, the voltage-RPM curve is the upper broken line of Figure 2. The voltage-RPM characteristic of the control generator CS is obtained by means of the different permeabilities obtainable with rising voltage-current.

Figure 3 indicates the principles of operation of this new speed control. As the rotor RPM increases along the line indicated, the current in the main generator (MG AMPS) decreases and so does that of the current in the separate field along the dotted line marked "Separate Field Decrease." This decrease in the separate field current is due to the opposing voltage generated by the control generator CS. As the rotor RPM decreases along the dotted line marked "Rotor RPM Decrease," due to increased loads, the current in the separate field will increase as well as the current through the main generator. When this rotor RPM decreases to the point indicated by the arrow and marked "Constant KW" which indicates the setting of the variable resistor VR by the engine governor all of which has been determined by the speed of the diesel engine, the current in the separate field will reach a magnitude which energizes the overriding solenoid ORS to place the maximum resistance of the variable resistor VR in electrical series circuit with the battery field and cause the separate field current to momentarily drop off. This further reduces the power output of the main generator G and causes the motors M1, M2, M3 and M4 to further reduce their speed rotors under the increased load until the whole system finally stops.

It may now be appreciated that a new speed control has been described in detail which may be used in combination with the type of motor generator power transmissions found in locomotives on the various railroads. This new means controls the speed of the series motors within permissible limits under the influence of widely variable loads without any substantial loss of energy, due in part to the unique manner in which the control is connected and in part to the unusual volt-speed characteristics of the control generator.

While this control has been specifically described in combination with a railway snow plow, it will be appreciated that the control is adaptable for many other uses and, therefore, there is no intention to limit the claims for this control to the particular means with which it has been identified.

What is claimed is:

In an electrical transmission including a driven main generator having a shunt field in a shunt field circuit whose resistance is above critical shunt field circuit resistance and a plurality of series motors in electrical parallel circuit relation with the armature of said main generator; means to automatically regulate the speeds of said motors comprising a separately excited field for said main generator, a substantially constant voltage source, a control generator operatively connected to the armatures of said motors for rotation thereby, the armature of said control generator being connected in series electrical circuit with said separately excited field and said voltage source to oppose the supply of voltage to said separately excited field by said voltage source in relation to the speeds of said motors, means to limit the voltage applied by said control generator to said separately excited field, and means to limit the current in said main generator.

References Cited in the file of this patent
UNITED STATES PATENTS

| | | |
|---|---|---|
| 1,003,464 | Janisch et al. | Sept. 16, 1911 |
| 1,048,548 | Kramer | Dec. 31, 1912 |
| 1,060,208 | Osborne | Apr. 29, 1913 |
| 1,699,024 | Schnitzer | Jan. 15, 1929 |
| 2,519,339 | Avery | Aug. 22, 1950 |
| 2,624,029 | Lillquist | Dec. 30, 1952 |
| 2,692,361 | Asbury et al. | Oct. 19, 1954 |